Aug. 1, 1961 A. GOTTWALD 2,994,347
SERVO-VALVE
Filed Feb. 15, 1960 3 Sheets-Sheet 1

INVENTOR
ANTONIN GOTTWALD

BY
Cushman, Darby & Cushman
ATTORNEYS

Aug. 1, 1961 A. GOTTWALD 2,994,347
SERVO-VALVE
Filed Feb. 15, 1960 3 Sheets-Sheet 2

INVENTOR
ANTONIN GOTTWALD
BY Cushman, Darby & Cushman
ATTORNEYS

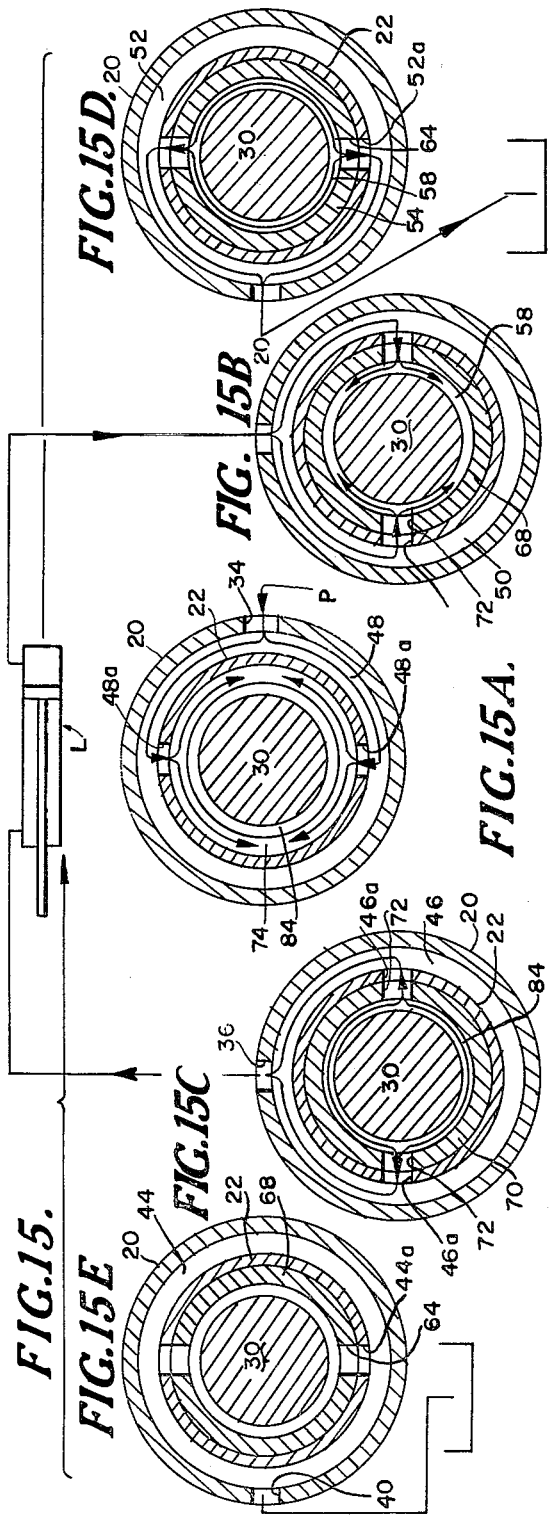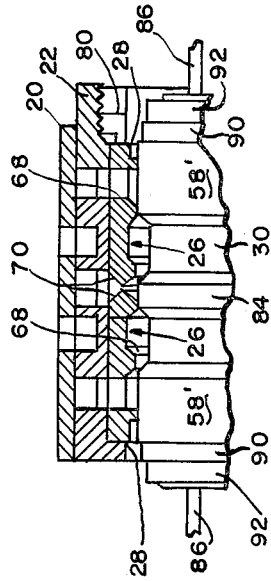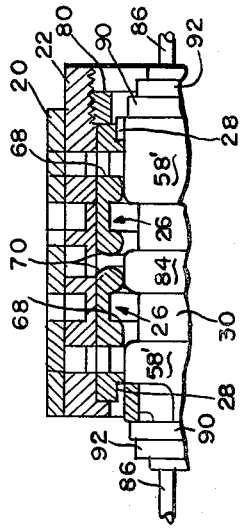

United States Patent Office
2,994,347
Patented Aug. 1, 1961

2,994,347
SERVO-VALVE
Antonin Gottwald, 541 Pelham Road,
New Rochelle, N.Y.
Filed Feb. 15, 1960, Ser. No. 8,630
14 Claims. (Cl. 137—622)

This invention relates to spool valves and, more particularly, to hydraulic servo valves having a solid reciprocating spool to control the fluid flow through the valve.

More specifically, this invention is concerned with a spool-type servo valve in which the spool is balanced radially by the controlled fluid to prevent motion of the spool other than axially of its casing. In addition to providing for a balanced spool, this invention provides a servo valve in which the internal leakage is reduced to an absolute minimum and one which is yet relatively inexpensive to manufacture as compared to the high cost servo valves now in use. In the known servo valves, fluid contacts the spool on only one side, creating substantial friction between it and the surrounding sleeve or casing. In order to reduce the friction a dither is employed which results in spool vibrations of approximately 100–500 c.p.s. Dither is eliminated in the present valve by introducing main pressure on opposite sides of the spool and also by introducing return pressure on opposite sides of the spool but spaced 90° circumferentially from the main pressure. This arrangement maintains the spool centered and balanced within its surrounding enclosure. Another inherent problem with machined servo valves is the internal leakage of fluid under pressure. In the most accurately machined valves this leakage amounts to approximately .12 g.p.m. In this invention leakage is effectively eliminated by the provision of means to adjust the fluid pressure port relative to the size of the control land on the spool, and also by providing means to adjust the spool lands relative to the position of the fluid ports. This adjustability feature eliminates the necessity of close tolerance machining and allows for the inexpensive manufacture of a superior servo valve. In a valve embodying this invention and having a spool of one-half inch diameter, leakage has been reduced to .001 g.p.m. when main pressure is 3000 p.s.i.

It is an object, therefore, of this invention to provide a spool-type servo valve in which the spool is completely balanced and centered in its surrounding casing.

It is another object of this invention to provide a spool valve of the hydraulic servo valve type in which internal fluid leakage is substantially eliminated.

It is an additional object of this invention to provide in a hydraulic spool-type servo valve means to adjust the pressure port opening to conform with the shape and size of the controlling land on the spool.

It is a still further object of this invention to provide in a spool-type hydraulic servo valve means by which the control lands on the spool may be adjusted upon the spool relative to the controlled port spacing in the surrounding enclosure.

It is an additional object of this invention to provide a spool-type hydraulic servo valve having no dither or hysteresis.

It is a still further object of this invention to provide a balanced spool-type servo valve that is inexpensive to manufacture, but which is highly efficient in operation.

These and further objects and advantages will become readily apparent to those skilled in the art upon reading the following detailed description taken in conjunction with the appended drawings in which:

FIGURE 11 is a fragmentary view of the valve of FIGURE 2 but showing one modification of the spool;

FIGURE 12 is a view corresponding to FIGURE 11 but showing an additional modification;

FIGURE 15 is a composite cross-sectional view taken on lines A—A, B—B, C—C, D—D and E—E of FIGURE 1 showing fluid flow when the spool is in the position of FIGURE 13;

FIGURE 15A is a cross-sectional view taken along the line A—A of FIGURE 1;

FIGURE 15B is a cross-sectional view taken along the line B—B of FIGURE 1;

FIGURE 15C is a cross-sectional view taken along the line C—C of FIGURE 1;

FIGURE 15D is a cross-sectional view taken along the line D—D of FIGURE 1; and

FIGURE 15E is a cross-sectional view taken along the line E—E of FIGURE 1.

Figure 1:
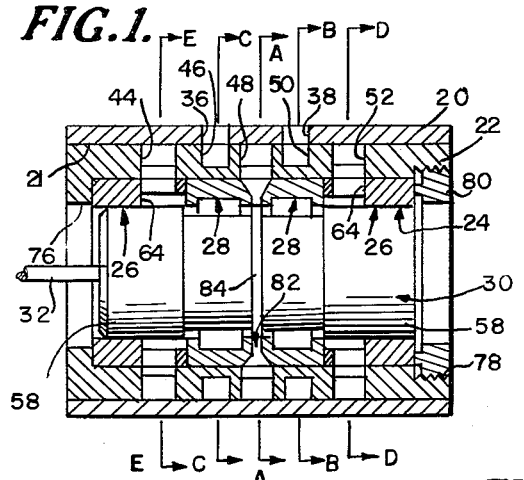
FIGURE 1 is an axial cross-sectional view of a servo valve embodying this invention.
Figure 3:
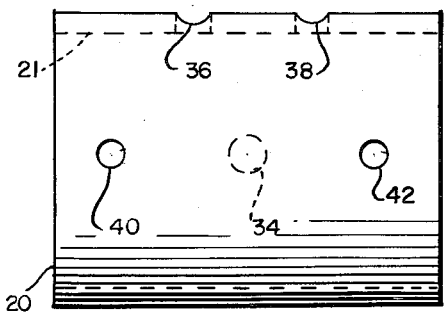
FIGURE 3 is a side elevational view of the outer valve casing.
Figure 2:
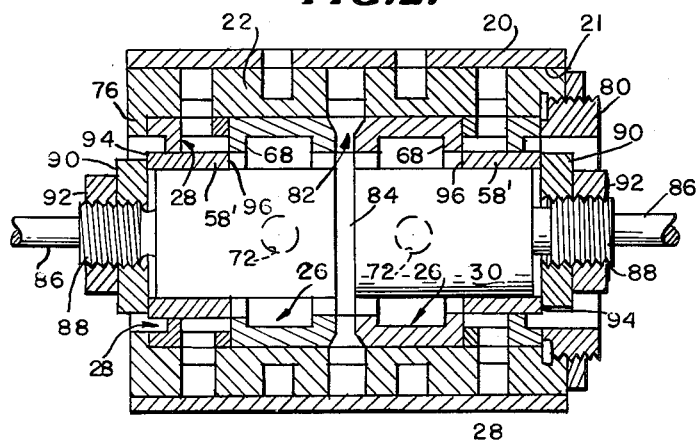
FIGURE 2 is a view corresponding to FIGURE 1 but showing a modified valve.
Figure 4:
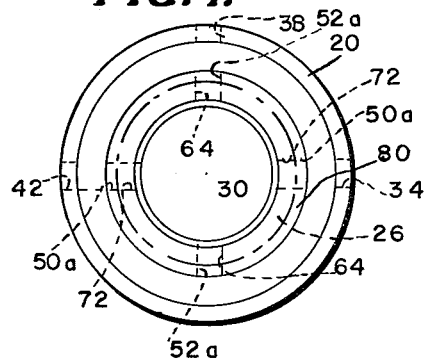
FIGURE 4 is an end view looking from the right of FIGURE 1.

Referring now to the drawings and in particular to FIGURES 1 through 3, there is shown the valve of this invention which comprises a cylindrical outer valve casing 20 having an axial through bore 21 within which is coaxially arranged a hollow sleeve member 22. Concentrically arranged within the hollow sleeve 22 is a sectional tubular sleeve, indicated at 24, and axially aligned, comprising annular sections 26 and 28. A spool 30 is concentrically disposed within the sectional sleeve 24 and is adapted to reciprocate axially therealong to control the flow of fluid through various ports in the aforementioned elements. One end of the spool 30 is adapted to be connected, as by the rod 32, to a suitable operating mechanism to cause its reciprocation.

The outer cylindrical valve casing 20 has a plurality of axially spaced fluid ports which extend radially therethrough. In the preferred embodiment of this invention a pressure port 34 is disposed medially of the outer casing 20, and two radial ports 36 and 38 are spaced 90° circumferentially from the pressure port 34 and axially apart and on opposite sides therefrom. An additional pair of radial fluid ports 40 and 42 are arranged in the casing 20 and spaced 90° circumferentially from the ports 36 and 38, and 180° circumferentially from the pressure port 34. The ports 40 and 42 are spaced axially outwardly of the ports 36 and 38 respectively and are positioned such that the ports 36 and 38 are disposed substantially midway between the ports 40 and 34, and 42 and 34 respectively, as best illustrated in FIGURE 3.

Figure 5:
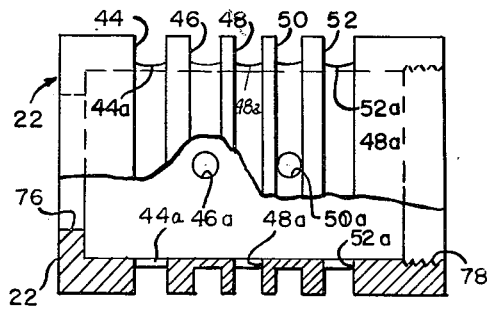
FIGURE 5 is a side elevational partially in section of the insert sleeve.
Figure 10:
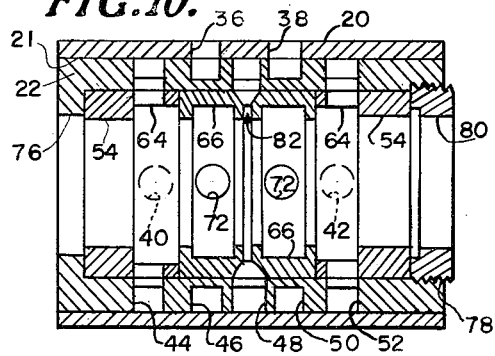
FIGURE 10 is a view corresponding to FIGURE 1, but with the spool removed.

The hollow sleeve 22, as best shown in FIGURE 5, is provided with a plurality of axially spaced exterior circumferential grooves 44, 46, 48, 50 and 52, with the axial spacing being such that when the sleeve 22 is disposed within the bore 21 of the casing 20 in fluid-tight arrangement, the groove 44 will be in alignment and communication with the casing port 40; the groove 46 with casing port 36; the groove 48 with pressure port 34; the groove 50 with casing port 38; and the groove 52 with casing port 42. Each of the grooves 44–52 in the hollow sleeve 22 is provided with a pair of diagonally opposed radial ports, indicated as 44a, 46a, 48a, 50a and 52a respectively, corresponding with the associated grooves 44–52. The particular arrangement of each pair of ports in the hollow sleeve grooves being such that they are spaced 90° circumferentially from the corresponding port in the outer casing member 20 as is best shown in FIGURE 10.

Figure 7:
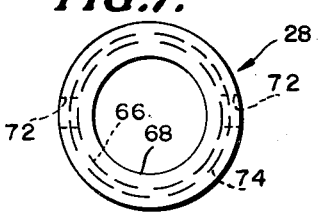
FIGURE 7 is an end view looking from the left of FIGURE 6.
Figure 9:
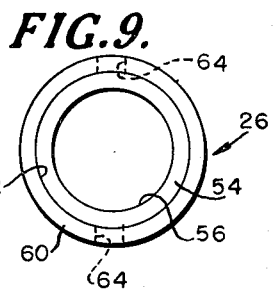
FIGURE 9 is an end view looking from the left of FIGURE 8.
Figure 6:
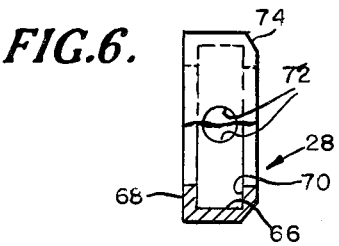
FIGURE 6 is a side elevation, partially in section, of one section of the sectional sleeve.
Figure 8:
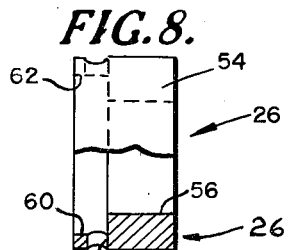
FIGURE 8 is a view corresponding to FIGURE 6 showing another section of the sectional sleeve.

The sectional sleeve 24 preferably comprises two pairs of annular sections 26 and 28 which are arranged coaxially within the hollow sleeve 22, with the sections 26 adjacent opposite ends of the hollow sleeve and opposed sections 28 between the two sections 26. The annular sections 26 are identical to each other and include a first annular portion 54 having an axial bore 56 of reduced diameter adapted to closely surround in fluid-tight relationship the associated metering land 58 of the spool 30, and a second portion 60 having a bore 62 of larger diameter than the bore 56 and diagonally opposed radial fluid ports 64. The annular sections 28, best shown in FIGURES 6 and 7, have an internal circumferential groove 66 which defines annular ribs 68 and 70 adjacent opposite ends of the section 28 and have diagonally opposed radial fluid ports 72 communicating with the groove 66. One end of the section 28 is bevelled, as at 74, for a purpose which will become apparent. When the sectional sleeve 24 is arranged within the hollow sleeve 22, one ring 26 is press fit within the sleeve 22 so that its portion 54 abuts against an internal annular rib 76 at one end of the sleeve, and its ports 64 are in alignment and communication with the ports 44a in the circumferential groove 44 of the sleeve. One annular section 28 is disposed adjacent the one section 26 such that its non-bevelled end abuts the portion 60 of the section 26 and the ports 72 of the section 28 are in alignment and communication with the ports 46a in the groove 46 of the sleeve 22. A second section 28 is disposed adjacent and opposite to the other section 28 so that their bevelled surfaces 74 face each other and its ports 72 are in alignment and communication with the ports 50a in the circumferential groove 50 of the sleeve 22. A second section 26 is disposed adjacent to the second section 28 such that the portion 60 of the second section 26 abuts the non-bevelled edge of the second section 28 and the ports 64 of the second section 26 are in alignment and communication with the ports 52a of the circumferential groove 52 of the sleeve 22. The end of the sleeve 22 opposite from its annular rib 76 is interiorly threaded, as at 78, to threadedly receive an annular adjusting nut 80 which maintains the axially aligned sections 26 and 28 within the sleeve 22. The nut 80 serves another function other than to maintain the axially aligned sections 26 and 28 within the sleeve 22. As previously mentioned, the two sections 26 are disposed within the sleeve 22 such that their bevelled edges 74 oppose each other, but the annular ribs 70 on each do not abut each other and define an annular space 82 between the two adjacent sections 26. When the sections 26 are properly aligned within the sleeve 22, the annular space 82 is adjacent the ports 48a in the hollow sleeve 22, which lie within the circumferential groove 48 of the sleeve and communicate with the pressure port 34 in the valve casing 20. Thus, the annular space 82 provides a fluid pressure port which cooperates with a thin annular control land 84 disposed medially and integral with the spool 30. Although the sections 26 and 28 are snugly fitted within the sleeve 22 and provide a fluid-tight seal therebetween, the second of the sections 26 and 28 may be moved axially within the sleeve 22. The axial movement of the latter sections 26 and 28 is accomplished by threading the nut 80 upon the threads 78 of the sleeve 22. By moving the latter two sections 26 and 28 axially, the annular space 82 between the opposed sections 26 may be varied, in accordance with the width of the pressure port control land 84 on the spool 30. By providing for the adjustability of the annular space 82, the necessity for a close tolerance machining of the control land on the spool 30 is eliminated and fluid leakage within the valve is eliminated as the annular space 82 may always be adjusted to conform with the dimensions of the pressure port control land 84.

In the modification shown in FIGURE 2, not only may the annular space 82 be adjusted to conform with the pressure port control land 84 but the control lands 58' on the spool 30 may likewise be axially adjusted to conform with the spacing of the sections 26 and 28. In the latter modification the control lands 58' rather than being formed integrally with the spool 30, as in the embodiment shown in FIGURE 1, comprise ring-like members which snugly surround opposite ends of the spool 30 in a fluid-tight relationship, but one which still affords axial movement of the lands 58' along the spool 30. In this arrangement the axial movement of the lands 58' is accomplished in a manner similar to the axial adjustment of the annular space 82. In particular, the spool 30 is provided with axial extensions 86 at its opposite ends, one of which may serve to connect the spool to a suitable operating mechanism to effect its reciprocation as the rod 32 in the embodiment of FIGURE 1. Each of the extensions 86 is provided with a threaded portion 88 adjacent the ends of the spool 30, and a pair of nuts 90 and 92 are threaded upon the extensions 88 with the inner nut 90 engaging the outer end 94 of the axially adjustable land 58'. The lands 58' may be moved axially of the spool 30 by threading the nuts 90 inwardly to exactly position the forward edge 96 of each control land 58' relative to the annular rib 68 on the opposed sleeve sections 26. The lands 58' may be maintained in their adjusted position by threading the nuts 92 inwardly on the extensions 88 to lock the nut 90 in its desired position. It will thus be seen that in this modification the necessity for a close tolerance machining of either the spool or the sleeve members 26 and 28 is effectively precluded in view of the fact that the control lands 58' are completely adjustable relative to the cooperating annular rib 68 on the sections 26 and by the axial adjustment of the annular space 82 relative to the dimensions of the pressure port control land 84.

Figure 13:
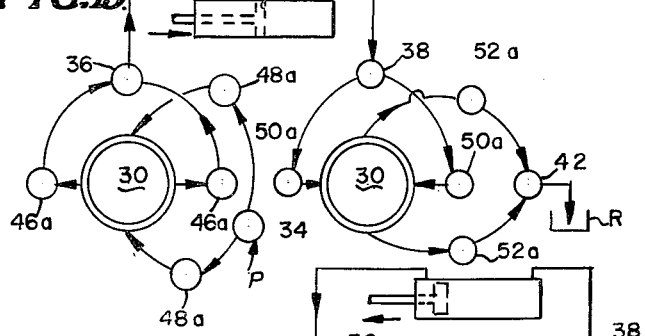
FIGURE 13 is a schematic diagram of fluid flow when the spool is moved in one direction.
Figure 14:
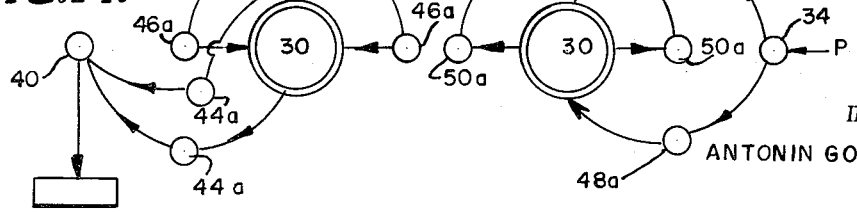
FIGURE 14 is a schematic diagram corresponding to FIGURE 13 showing the fluid flow when the spool is moved in the opposite direction.

In the known servo valves there are basically three different types, namely, the underlap, the overlap, and the ideal type, the underlap being when the control lands on the spool are of lesser dimension than the cooperating controlled ports; while the overlap is the opposite in that the control lands are larger than the controlled ports. In the latter type a greater degree of movement of the spool relative to the controlled ports is required in order to have the desired fluid flow through the valve. As the valve of this invention is capable of complete adjustment of the ports and control lands, any of the three basic types of servo valves may be effected by a single structure. Another shortcoming of the known servo valves is that the control lands and cooperating annular ribs have sharp machined edges which in time tend to become round or otherwise lose their sharpness due to the presence of small metallic particles in the fluid or due to dirt in the fluid which may come from the pump. When the sharp edges become rounded it is usually necessary to discard the entire servo valve; however, in the valve of this invention this is not necessary as the sections 26 and 28 may be removed and remilled and the spool lands may be re-sharpened and then the valve may be re-assembled and re-adjusted, as described above. Another shortcoming of the sharp-edge servo valve is that the fluid passing through the valve loses approximately 30% of its initial pressure because the edges convert about 30% of the pressure energy into heat. In the servo valve of this invention the edges of the spool lands 84 and 58' and the annular ribs 68 and 70 of the opposed sections 26 may be made of a different shape. In the embodiment shown in FIGURE 12 the edges of the lands 84 and 58' and the annular ribs 68 and 70 may be bevelled to provide a valve in which the pressure loss is reduced to approximately 18 to 20%. In the embodiment shown in FIGURE 11 the edges of the control lands 58' and 84 and the annular ribs 68 and 70 are rounded, which results in a pressure loss of only 6 to 8%. The rounding or bevelling of the cooperating edges of the spool 30 and sectional sleeve 24 is only possible in a valve wherein the lands and ports are readily adjustable as is the valve disclosed in FIGURES 2, 11 and 12 of this invention. The centering and balancing of the spool 30 within the sectional sleeve 24 in each of the modifications is the same and is shown schematically in FIGURES 13 and 14. In FIGURE 13 there is shown the fluid flow when the spool 30 is moved to the right of its position shown in FIGURES 1 and 2 so that the control land 84 is in fluid-tight engagement with the annular rib 70 of the right-hand annular section 28 and the left-hand control land 58 is in fluid-tight engagement with the annular rib 68 of the left-hand annular section 26. With the spool 30 in this position fluid under pressure from a pressure source P enters the valve through the port 34 in the casing 20 and then passes around the circumferential groove 48 in the sleeve 22 and thence through the diagonally opposed ports 48a into the annular space 82. The fluid then passes around the spool 30 and through the groove 66 of the left-hand section 28 of the sectional sleeve 24 until it reaches the diagonally opposed ports 72 therein, and then passes outwardly through the ports 72 and the aligned ports 46a in the sleeve 22 and then about the sleeve 22 through the groove 46 and thence outwardly of the vlave through the port 36 in the casing 20. The fluid then flows to the load or fluid motor L which is controlled by the valve. Simultaneous with the pressure flow as described the fluid motor or load L dumps through the opposite side of the valve in the following manner. The dump fluid enters the valve through the port 38 in the casing 20 and then passes around the circumferential groove 50 until it reaches the diagonally opposed ports 50a in alignment with ports 72 in the right-hand section 28. The fluid then passes about the spool 30 through the interior groove 66 of the right-hand section 28 and then outwardly through the ports 64 in the right-hand section 26, around the circumferential groove 52 of the hollow sleeve 22 and then outwardly through the port 42 in the valve casing 20 to a reservoir R. In FIGURES 15A through 15E the identical fluid path just described is shown at various points relative to the spool 30. In each figure, due to the spacing of the ports circumferentially from each other, in accordance with the teachings of this invention, fluid under pressure and return fluid completely surround the spool 30 in passing from one port to the other in the sectional sleeve 24 controlled by the lands 58 and 84 on the spool. This surrounding of the spool 30 adjacent to the fluid ports controlled thereby centers the spool coaxially with the sectional sleeve 24 and provides for its easy reciprocation due to the elimination of any substantial friction between the spool and the surrounding sleeve. It is to be noted that in every point of fluid contact with the spool 30 the fluid completely passes around the spool and thus provides for the improved operation of the valve. In FIGURE 14 there is shown schematically the fluid flow when the spool 30 is moved to the left of the position shown in FIGURES 1 and 2. As in the case of the aforementioned fluid flow, when the spool is moved in the opposite direction it is completely balanced by having the fluid flow around the spool at every point of common contact.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative and not in a limiting sense.

I claim:

1. A valve assembly comprising: a valve casing having a bore therethrough and a plurality of axially spaced ports communicating with said bore; a hollow sleeve disposed within said bore and in fluid-tight relation therewith; a sectional tubular sleeve concentrically arranged in said hollow sleeve, each section of said sectional sleeve being axially aligned and each having radial ports therein; means communicating the ports of said casing with the ports of said sleeve sections; means defining a space between two adjacent sleeve sections, said space defining a pressure port in communication with one port in said casing; a spool concentrically disposed within said sectional sleeve and adapted for axial movement therein, axially spaced metering lands on said spool to cooperate with the ports in said sleeve sections, an additional metering land disposed between said metering lands cooperating with said pressure port; and means to vary the space between the said two adjacent sleeve sections.

2. The valve assembly defined in claim 1 in which said pressure port is disposed between two pairs of sleeve sections, one of said pairs of sleeve sections in engagement with fixed abutment in said hollow sleeve disposed adjacent one of its ends, the other end of said hollow sleeve being internally threaded, a threaded annular adjusting nut carried by the threads of said hollow sleeve, the other pair of said sleeve sections abutting said adjusting nut whereby the pressure port may be varied by moving said adjusting nut along the threads of said hollow sleeve.

3. The valve assembly defined in claim 1 in which said means communicating said ports in said casing with the ports in said sleeve sections comprises axially spaced exterior circumferential grooves in said hollow sleeve in alignment with said ports in said casing, and ports in said grooves in alignment with the ports in sleeve sections, and a port in one of said grooves communicating with said pressure port.

4. The valve assembly defined in claim 3 in which ports in adjacent grooves are circumferentially spaced from each other, each of said ports being circumferentially spaced from its corresponding port in said casing whereby fluid passes around the grooves in said hollow sleeve and through said ports therein and said aligned ports in said sleeve sections, said spool being contacted at circumferentially spaced points by fluid from two adjacent sleeve sections to balance said spool.

5. The valve assembly defined in claim 4 in which said casing comprises a tubular member concentrically disposed about said hollow sleeve, adjacent ports in said casing being circumferentially spaced from each other and from the corresponding ports in said grooves.

6. A valve assembly comprising: a valve casing having a bore therethrough and a plurality of axially spaced ports communicating with said bore; a hollow sleeve disposed within said bore and in fluid-tight relation therewith; a sectional tubular sleeve concentrically arranged in said hollow sleeve, each section of said sectional sleeve being axially aligned and each having radial ports therein; means communicating the ports of said casing with the ports of said sleeve sections; means defining a space between two adjacent sleeve sections, said space defining a pressure port in communication with one port in said casing, each of said two adjacent sleeve sections having an interior circumferential groove in alignment with its radial ports, said grooves defining interior annular ribs axially disposed on opposite sides of said radial ports; a spool concentrically disposed within said sectional sleeve and adapted for axial movement therein, axially spaced metering lands on said spool, said metering lands cooperating with said annular ribs to control the passage of fluid through said radial ports when said spool is axially moved.

7. The device defined in claim 6 in which the edges of said annular ribs are bevelled and wherein the lands on said spool are bevelled.

8. The device defined in claim 6 in which the edges of said ribs and the edges of said lands are rounded.

9. The valve assembly defined in claim 6 in which said pressure port is disposed between two pairs of sleeve sections, one of said pairs of sleeve sections in engagement with fixed abutment in said hollow sleeve disposed adjacent one of its ends, the other end of said hollow sleeve being internally threaded, a threaded annular adjusting nut carried by the threads of said hollow sleeve, the other pair of said sleeve sections abutting said adjusting nut whereby the pressure port may be varied by moving said adjusting nut along the threads of said hollow sleeve.

10. The valve assembly defined in claim 6 in which said means communicating said ports in said casing with the ports in said sleeve sections comprises axially spaced exterior circumferential grooves in said hollow sleeve in alignment with said ports in said casing, and ports in said grooves in alignment with the ports in sleeve sections, and a port in one of said grooves communicating with said pressure port.

11. The valve assembly defined in claim 10 in which ports in adjacent grooves are circumferentially spaced from each other, each of said ports being circumferentially spaced from its corresponding port in said casing whereby fluid passes around the grooves in said hollow sleeve and through said ports therein and said aligned ports in said sleeve sections, said spool being contacted at circumferentially spaced points by fluid from two adjacent sleeve sections to balance said spool.

12. The valve assembly defined in claim 10 in which said casing comprises a tubular member concentrically disposed about said hollow sleeve, adjacent ports in said casing being circumferentially spaced from each other and from the corresponding ports in said grooves.

13. In a valve assembly including a ported valve casing and a ported hollow sleeve disposed within the casing: a composite spool concentrically arranged within said hollow sleeve and adapted for axial movement therein, said spool being provided with metering lands to control the flow of fluid through the ports of said hollow sleeve, one of said metering lands being integral with said spool and cooperating with a pressure port in said hollow sleeve, and means to axially adjust said other lands on said spool.

14. The device as defined in claim 13 in which said spool is provided with a threaded axial extension on each of its ends, nuts threaded on said axial extensions, said nuts engaging a portion of said other lands, whereby said lands are moved axially along said spool upon moving of said nuts on said threaded extensions.

References Cited in the file of this patent

UNITED STATES PATENTS

| | | |
|---|---|---|
| 1,889,269 | Woodbury et al. | Nov. 29, 1932 |
| 2,054,464 | Johnson | Sept. 15, 1936 |
| 2,481,293 | Cooney | Sept. 6, 1949 |
| 2,621,676 | Loft | Dec. 16, 1952 |
| 2,630,135 | Johnson | Mar. 3, 1953 |